United States Patent
Nishikawa et al.

(10) Patent No.: US 8,371,662 B2
(45) Date of Patent: Feb. 12, 2013

(54) WHEEL BRAKING CONTROLLER OF VEHICLE

(75) Inventors: Yutaka Nishikawa, Saitama (JP); Kazuya Takenouchi, Saitama (JP); Masaie Kato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1100 days.

(21) Appl. No.: 11/979,060

(22) Filed: Oct. 30, 2007

(65) Prior Publication Data

US 2008/0136253 A1 Jun. 12, 2008

(30) Foreign Application Priority Data

Nov. 29, 2006 (JP) .................. 2006-321911

(51) Int. Cl.
*B60T 8/42* (2006.01)
*B62L 3/02* (2006.01)
*B62L 3/08* (2006.01)

(52) U.S. Cl. ........ 303/115.2; 303/3; 303/15; 303/113.1; 303/113.4; 303/113.5; 303/119.2; 303/119.3; 303/121; 303/137; 188/72.1; 188/162

(58) Field of Classification Search .................. 303/1, 3, 303/9.64, 20, 113.1, 113.4–113.5, 115.2, 303/116.4, 119.2–119.3, 137, DIG. 10; 188/181 A
See application file for complete search history.

(56) References Cited

U.S. PATENT DOCUMENTS

| | | | | |
|---|---|---|---|---|
| 5,249,848 A | * | 10/1993 | Matsuto et al. | ............... 303/163 |
| 6,270,170 B1 | * | 8/2001 | Isogai et al. | ............... 303/119.3 |
| 7,766,432 B2 | * | 8/2010 | Hinz et al. | ................ 303/137 |
| 2001/0030461 A1 | * | 10/2001 | Anderson | ......................... 303/3 |
| 2005/0134114 A1 | * | 6/2005 | Asahi | .............................. 303/137 |
| 2005/0168059 A1 | | 8/2005 | Nishikawa et al. | |
| 2005/0168062 A1 | * | 8/2005 | Nishikawa et al. | ............. 303/20 |
| 2005/0168063 A1 | * | 8/2005 | Tani et al. | .................. 303/113.5 |
| 2008/0078601 A1 | * | 4/2008 | Miki et al. | ..................... 180/219 |
| 2008/0106145 A1 | | 5/2008 | Hinz et al. | |

FOREIGN PATENT DOCUMENTS

| | | |
|---|---|---|
| DE | 10 2005 024 979 A1 | 6/2006 |
| JP | 9-71232 A | 3/1997 |
| JP | 10-258724 A | 9/1998 |
| JP | 11-314591 A | 11/1999 |
| JP | 2005-212680 A | 8/2005 |
| JP | 2006-117076 A | 5/2006 |
| WO | WO 2006040262 A1 * | 4/2006 |

* cited by examiner

*Primary Examiner* — Robert A Siconolfi
*Assistant Examiner* — San Aung
(74) *Attorney, Agent, or Firm* — Birch, Stewart, Kolasch & Birch, LLP (57) ABSTRACT

A wheel braking controller of a vehicle includes a brake lever operated by a rider, a master cylinder generating a hydraulic pressure according to an operation force of the brake lever, and a brake caliper braking a front wheel based on operation of the brake lever, a channel switching unit provided between the master cylinder and the brake caliper and switching channels of a brake fluid. A hydraulic pressure generator generates a hydraulic pressure based on operation of the brake lever and the driving state of the vehicle and controlling braking of the front wheel using the brake caliper by the hydraulic pressure. A braking controller including the channel switching unit and the hydraulic pressure generator is integrally provided on one body. The wheel braking controller so configured reduces the number of parts, and provides for easy mounting of the controller on the vehicle body.

16 Claims, 10 Drawing Sheets

FIG. 11

WHEEL BRAKING CONTROLLER OF VEHICLE

CROSS-REFERENCE TO RELATED APPLICATION

The present application claims priority under 35 U.S.C. §119 to Japanese Patent Application No. 2006-321911, filed Nov. 29, 2006, the entire contents of which are hereby incorporated by reference.

BACKGROUND OF THE INVENTION

1. Field of the Invention

The present invention relates to an improvement in a wheel braking controller of a vehicle.

2. Description of Background Art

In recent years, there has been developed a wheel braking controller of a motorcycle of a "drive-by-wire" type which electrically detects the amount of operation of a brake operation unit such as a brake lever and controls a wheel based on the amount of detection and the driving state of the vehicle.

There has been known such related art wheel braking controller of a vehicle which has a channel switching unit switching channels of a brake fluid and a hydraulic pressure generator generating a hydraulic pressure based on the electrically detected amount of operation of a brake operation unit and the driving state of the vehicle, and controlling braking of a wheel of wheel braking control means by the hydraulic pressure (For instance, see JP-A No. 2005-212680.

FIGS. 1 and 3 of JP-A No. 2005-212680 will be described below.

In FIGS. 1 and 3, a brake device has a brake operation unit 2 including a brake lever, a master cylinder 3 generating a hydraulic pressure of a brake fluid by operation of the brake operation unit 2, a channel switching unit 8 connected to the master cylinder 3 via a pipe, a hydraulic pressure modulator 6 connected to the channel switching unit 8 via a pipe, and a pair of brake calipers 4 and 4 connected to the hydraulic pressure modulator 6 via a pipe.

The channel switching unit 8 and the hydraulic pressure modulator 6 are mounted on the frame of a vehicle body via mounting members such as brackets. The mounting members are necessary for the channel switching unit 8 and the hydraulic pressure modulator 6. The number of parts is thereby increased.

An object of the present invention is to improve a wheel braking controller which can reduce the number of parts and can be easily mounted on a vehicle body.

SUMMARY AND OBJECTS OF THE INVENTION

According to a first aspect of the present invention, a wheel braking controller of a vehicle including a brake operation member operated by a rider, a master cylinder generating a hydraulic pressure according to an operation force of the brake operation member, wheel braking means braking a wheel based on operation of the brake operation member, a channel switching unit provided between the master cylinder and the wheel braking means and switching channels of a brake fluid, and a hydraulic pressure generator generating a hydraulic pressure based on operation of the brake operation member and the driving state of the vehicle and controlling braking of the wheel using the wheel braking means by the hydraulic pressure, wherein a braking controller including the channel switching unit and the hydraulic pressure generator is integrally provided on one body.

As an operation, in the related art, the channel switching unit and the hydraulic pressure generator are mounted on a vehicle body by different mounting members. In the present invention, the channel switching unit and the hydraulic pressure generator are provided on one body and mounted on the vehicle body by shared mounting members.

The number of mounting members and the number of fastening members fastening the mounting members to the vehicle body side can be reduced. The number of parts can be reduced. The weight increase of the vehicle can be suppressed. The wheel braking controller can be simplified. With reduction of the number of the mounting members, the mounting man-hours can be reduced. The channels connecting the channel switching unit and the hydraulic pressure generator are formed in the body. Connecting members such as hoses connecting the channel switching unit and the hydraulic pressure generator in the related art can be omitted. The constitution of the wheel braking controller can be simplified.

According to a second aspect of the present invention, an actuator as a driving source of the hydraulic pressure generator is housed in the width of the channel switching unit.

As an operation, the amount of protrusion of the actuator of the hydraulic pressure generator can be reduced with respect to the channel switching unit. The braking controller can become smaller and compact.

According to a third aspect of the present invention, the actuator is constituted by an electric motor, and the braking controller is mounted on the vehicle in the state that a rotation axis of the electric motor is vertical or almost vertical and in the state that the output side of the rotation axis is directed downward.

As an operation, when a brush and a commutator as a mating material of the brush in the electric motor are arranged toward the lower end side of the rotation axis and abrasion particulates are caused from the brush, the abrasion particulates can fall downward.

According to a fourth aspect of the present invention, the channel switching unit has a first electromagnetic valve opening and closing the channel between the master cylinder and the wheel braking means and a second electromagnetic valve opening and closing the channel between the hydraulic pressure generator and the wheel braking means, and the first electromagnetic valve and the second electromagnetic valve are mounted in the state that the respective axial directions are horizontal or almost horizontal to the ground.

As an operation, air included in the first electromagnetic valve and the second electromagnetic valve can be easily released.

According to a fifth aspect of the present invention, the body of the braking controller is formed with the channels, and the channels of the channel switching unit are concentrated on one surface side of the body.

As an operation, the channels are concentrated on one surface side of the braking controller, and thereby, the length of the channels can be shortened, so that the channels can be easily processed. When connecting members such as hoses are connected to these channels from outside, they can be connected in the same direction. Further, although the wall thickness of the body is necessary for forming the channels, only one side of the body requires the wall thickness, so that the body can be prevented from being larger.

Effects of the Invention Include the Following:

According to the first aspect of the present invention, the braking controller including the channel switching unit and the hydraulic pressure generator is integrally provided on one body. As compared with the related art in which the channel switching unit and the hydraulic pressure generator are mounted separately, the number of mounting members such as brackets, bolts, and nuts necessary for mounting on the vehicle body can be reduced. Further, connecting members such as hoses connecting the channel switching unit and the hydraulic pressure generator can be omitted. The number of parts can be reduced, leading to the suppression of weight increase of the vehicle. The wheel braking controller can be simplified. With reduction of the number of the mounting members, the mounting man-hours can be reduced.

According to the second aspect of the present invention, an actuator as a driving source of the hydraulic pressure generator is housed in the width of the channel switching unit. The braking controller can become smaller and compact. The occupation space of the braking controller can be smaller and can be easily arranged in a small space of the vehicle.

According to the third aspect of the present invention, the actuator is constituted by an electric motor, and the braking controller is mounted on the vehicle in the state that a rotation axis of the electric motor is vertical or almost vertical and in the state that the output side of the rotation axis is directed downward. When a brush and a commutator in the electric motor are arranged toward the lower end side of the rotation axis, abrasion particulates caused from the brush can fall downward.

According to the fourth aspect of the present invention, the channel switching unit has a first electromagnetic valve opening and closing the channel between the master cylinder and the wheel braking means and a second electromagnetic valve opening and closing the channel between the hydraulic pressure generator and the wheel braking means, and the first electromagnetic valve and the second electromagnetic valve are mounted in the state that the respective axial directions are horizontal or almost horizontal to the ground. Air releasability from the first electromagnetic valve and the second electromagnetic valve can be improved. The maintainability can be improved.

According to the fifth aspect of the present invention, the body of the braking controller is formed with the channels, and the channels of the channel switching unit are concentrated on one surface side of the body, so that the length of the channels can be shortened, and the channels can be easily processed. When connecting members are connected to the channels from outside, they can be connected in the same direction, thereby the connecting operation can be easily performed. Although the wall thickness of the body is necessary for forming the channels, only one side of the body requires the wall thickness, so that the body can be prevented from being larger.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
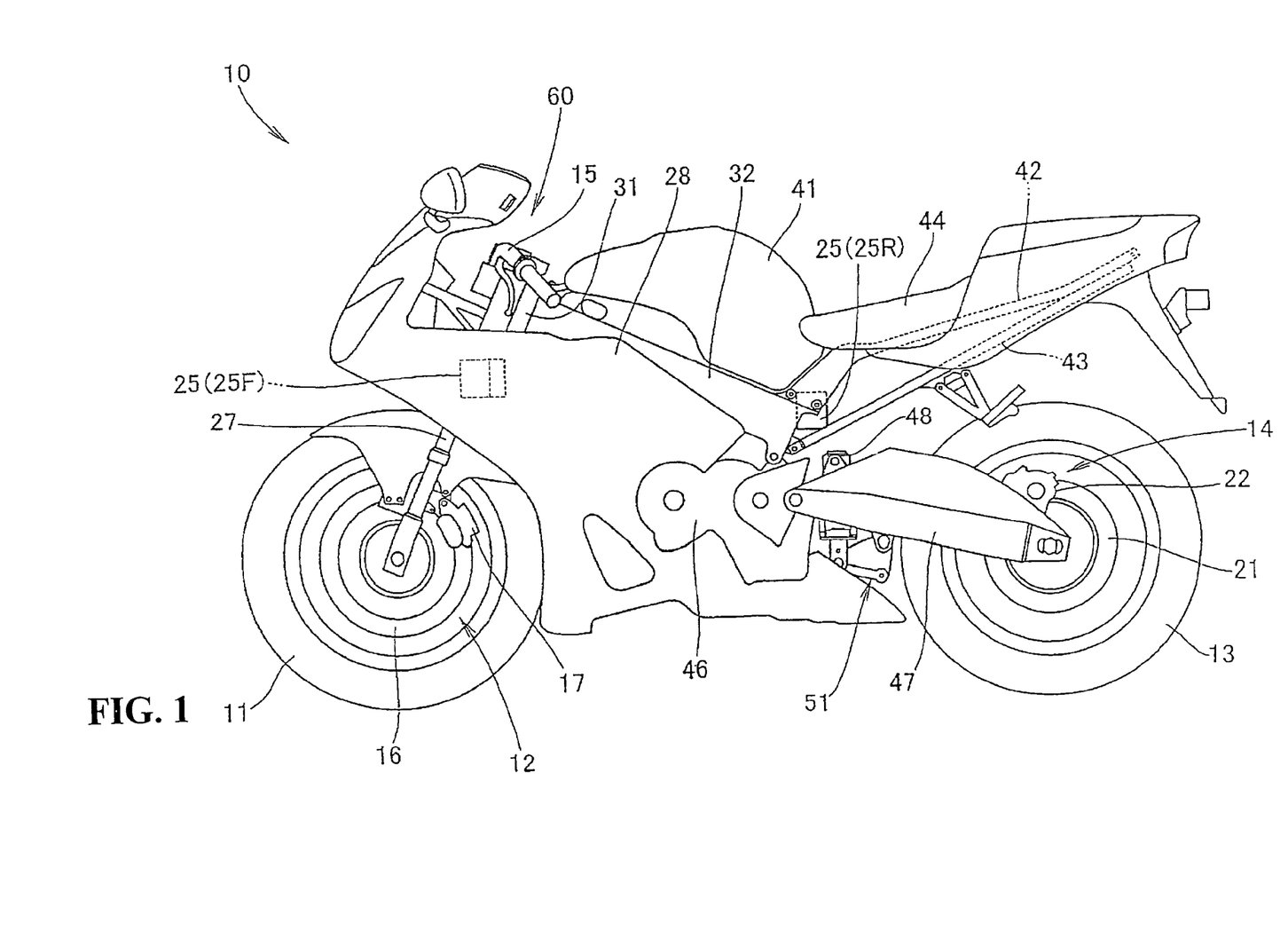
FIG. 1 is a side view of a vehicle on which a wheel braking controller according to the present invention is mounted.

FIG. 1 is a side view of a vehicle on which a wheel braking controller according to the present invention is mounted. A vehicle 10 has a front brake device 12 braking a front wheel 11, and a rear brake device 14 braking a rear wheel 13. A brake lever (not shown) provided on a handlebar 15 is operated to activate the front brake device 12. A brake pedal (not shown) provided near a step is operated to activate the rear brake device 14.

The front brake device 12 has a brake disc 16 mounted on the front wheel 11, and a brake caliper 17 generating a braking force by sandwiching the brake disc 16.

The rear brake device 13 has a brake disc 21 mounted on the rear wheel 13, and a brake caliper 22 generating a braking force by sandwiching the brake disc 21.

The front brake device 12 is provided with a braking controller 25 generating a braking force generated according to brake operation of a rider. The braking controller 25 is mounted on the inner portion of a cowling 28 sideward of a front fork 27 steered by the handlebar 15 (the braking controller is 25F), or in the rear portions of a pair of right and left main frames 32 and 32 (only the reference numeral 32 in front is shown) extended rearward and diagonally downward from a head pipe 31 rotatably supporting the handlebar 15, specifically, on a cross pipe (not shown and positioned above a later-described rear cushion unit 48) coupling the right and left main frames 32 and 32 (the braking controller is 25R). The rear brake device 14 is also provided with the same braking controller.

The braking controller 25 constitutes part of a later-described wheel braking controller 60.

Here, the reference numeral 41 denotes a fuel tank mounted in the upper portions of the main frames 32 and 32, the reference numerals 42 and 42 (only the reference numeral 42 in front is shown) and the reference numerals 43 and 43 (only the reference numeral 43 in front is shown) denote a pair of right and left seat rails and a pair of right and left subframes mounted on the rear portions of the main frames 32 and 32, respectively, the reference numeral 44 denotes a seat mounted on the seat rails 42 and 42, the reference numeral 46 denotes an engine mounted on the lower portions of the main frames 32 and 32, the reference numeral 47 denotes a swing arm mounted on the rear portion of the engine 46 so as to be swingably in the vertical direction and supporting the rear wheel 13, and the reference numeral 48 denotes a rear cushion unit having an upper end mounted on the upper portion of the swing arm 47 and a lower end mounted on the lower portion of the swing arm 47 via a link mechanism 51 and on the lower portion of the rear portion of the engine 46.

Figure 2A:
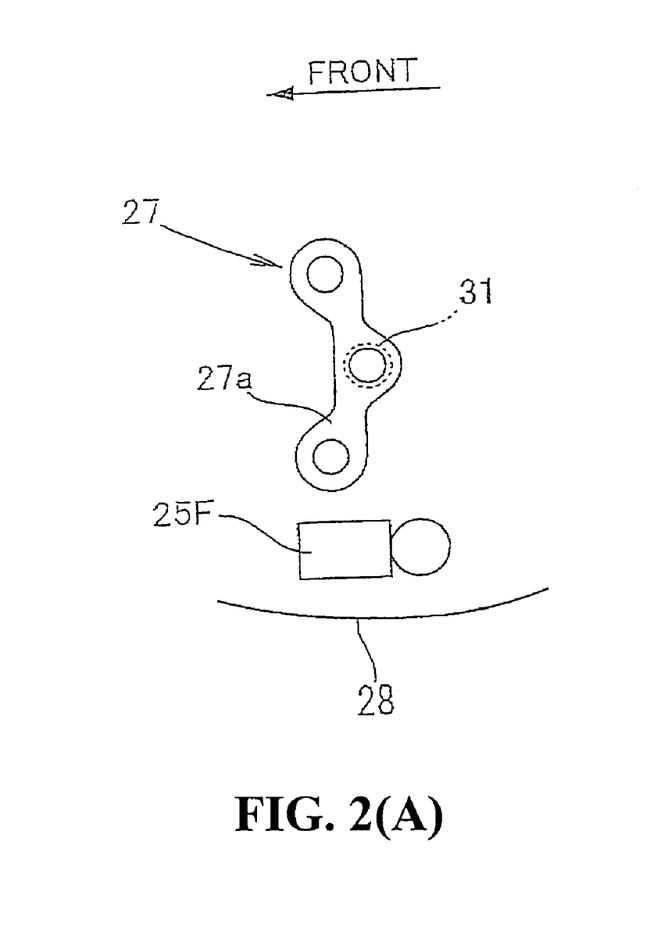
FIGS. 2(a) and 2(b) are explanatory views showing the arrangement of the braking controller according to the present invention.
Figure 2B:
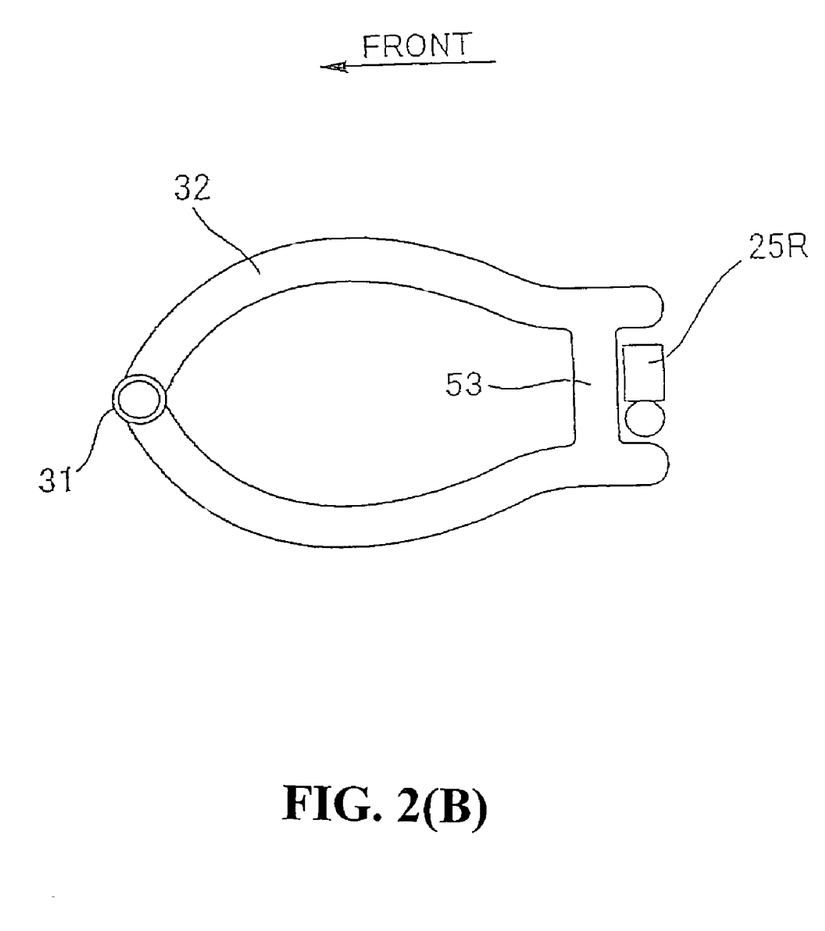

FIGS. 2(a) and 2(b) are explanatory views showing the arrangement of the braking controller according to the present invention and arrows (FRONT) in the drawings indicate the front of the vehicle.

FIG. 2(a) is a diagram seen in the axial direction of a steering stem rotatably fitted in the head pipe 31, in which the braking controller 25 is arranged sideward of the front fork 27 (the reference numeral 27a denotes a top bridge constituting the front fork 27) and inside the cowling 28 (the braking controller is the braking controller 25F shown in FIG. 1).

FIG. 2(b) is a plan view of the main frame 32 and the braking controller 25, in which the braking controller 25 is arranged rearward of a cross pipe 53 provided in the rear portion of the main frame 32 so as to be extended in the vehicle width direction (the braking controller is the braking controller 25R shown in FIG. 1).

Figure 3:
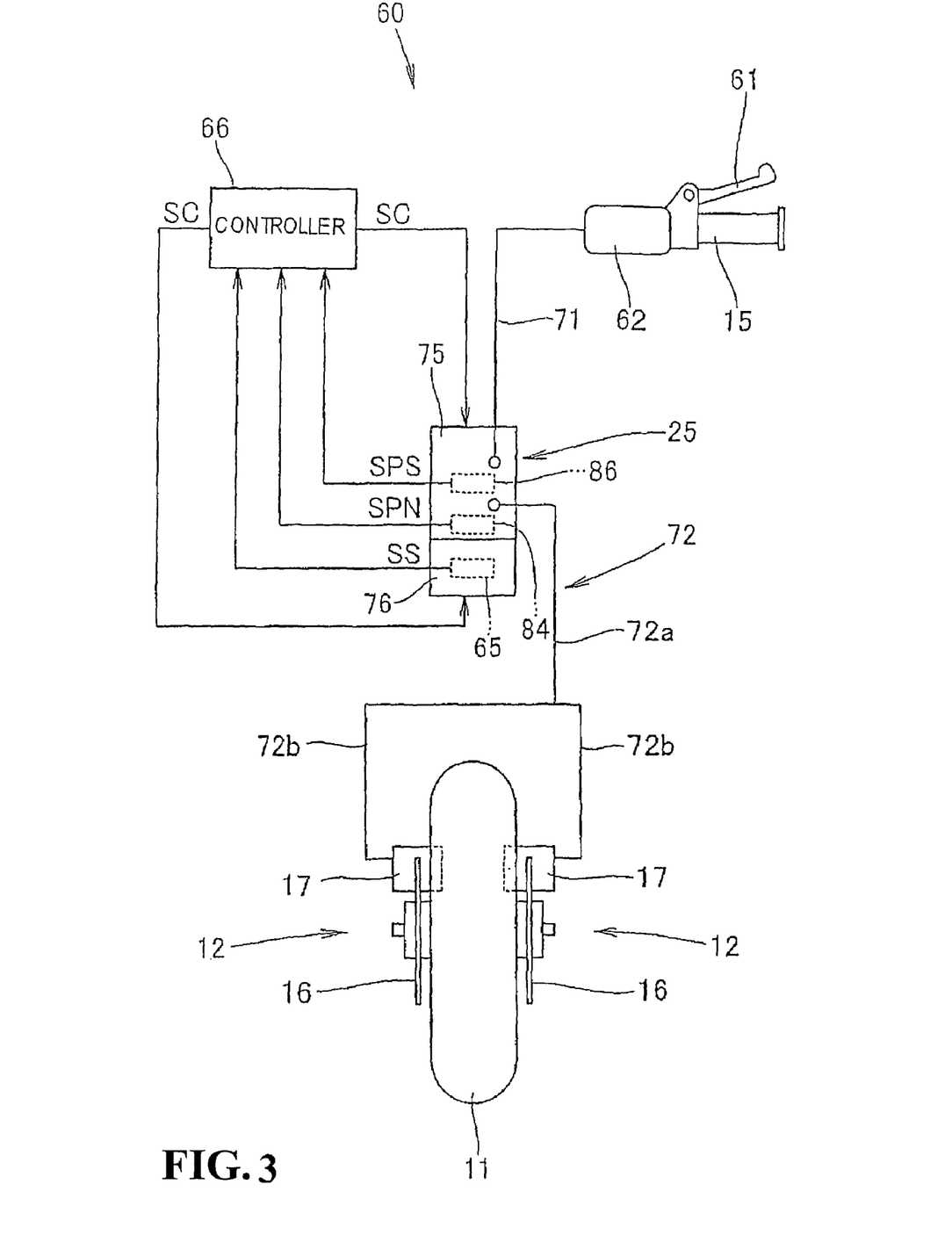
FIG. 3 is an explanatory view showing the wheel braking controller according to the present invention.

FIG. 3 is an explanatory view showing the wheel braking controller according to the present invention. The wheel braking controller 60 has a brake lever 61 as a brake operation member operated by a rider, a master cylinder 62 generating a hydraulic pressure of a brake fluid according to an operation force of the brake lever 61, the brake calipers 17 and 17 as wheel braking means braking the front wheel 11 based on operation of the brake lever 61, the braking controller 25 connected to the master cylinder 62 and the brake calipers 17 and 17, an input side pressure sensor 84 (described later in detail) provided in the braking controller 25 for detecting the amount of operation of the brake lever 61, a stroke sensor 65 (described later in detail) provided in the braking controller 25, an output side pressure sensor 86 (described later in detail) provided in the braking controller 25, and a controller 66 controlling the braking controller 25 by transmitting a control signal SC to the braking controller 25 based on an input side pressure signal SPN from the input side pressure sensor 84, a stroke signal SS from the stroke sensor 65, an output side pressure signal SPS from the output side pressure sensor 86, and signals from various sensors such as a wheel rotation speed sensor detecting the running state of the vehicle. The reference numeral 71 denotes a brake pipe connecting the master cylinder 62 and the braking controller 25, the reference numeral 72 denotes a brake pipe connecting the braking controller 25 and the brake calipers 17 and 17, and the reference numerals 72a, 72b, and 72b denote pipes constituting the brake pipe 72.

The braking controller 25 has a channel switching unit 75 switching channels of a brake fluid, and a hydraulic pressure generator 76 generating a hydraulic pressure of the brake fluid.

The channel switching unit 75 is connected to the brake pipes 71 and 72. Opening and closing of plural incorporated electromagnetic vales (described later in detail) are controlled by the control signal SC from the controller 66 to switch the channels.

The hydraulic pressure generator 76 generates a hydraulic pressure by the control signal SC from the controller 66.

The channel switching unit 75 switches three channels, that is, (1) the channel from the master cylinder 62 to the brake calipers 17 and 17, (2) the channel from the master cylinder 62 to the inside of the channel switching unit 75, and (3) the channel from the hydraulic pressure generator 76 to the brake calipers 17 and 17.

Figure 4:
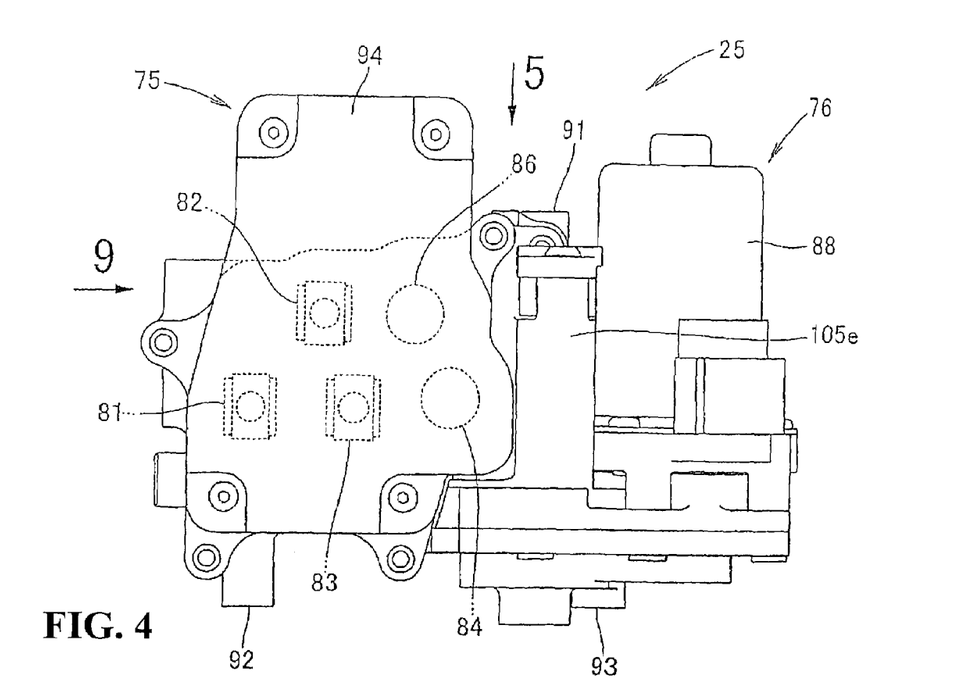
FIG. 4 is a side view of the braking controller according to the present invention.

FIG. 4 is a side view of the braking controller according to the present invention. The braking controller 25 is integrally provided with plural electromagnetic valves, that is, a first electromagnetic valve 81, a second electromagnetic valve 82, a third electromagnetic valve 83, the input side pressure sensor 84, the output side pressure sensor 86, the channel switching unit 75 provided with plural channels connected to the first electromagnetic valve 81, the second electromagnetic valve 82, the third electromagnetic valve 83, the input side pressure sensor 84, and the output side pressure sensor 86, and the hydraulic pressure generator 76 having an electric motor 88 as a driving source generating a hydraulic pressure. The reference numerals 91 to 93 denote vehicle body side mounting portions for mounting the braking controller 25 on the vehicle body side, and the reference numeral 94 denotes a side portion cover covering the side portion of the channel switching unit 75.

Figure 5:
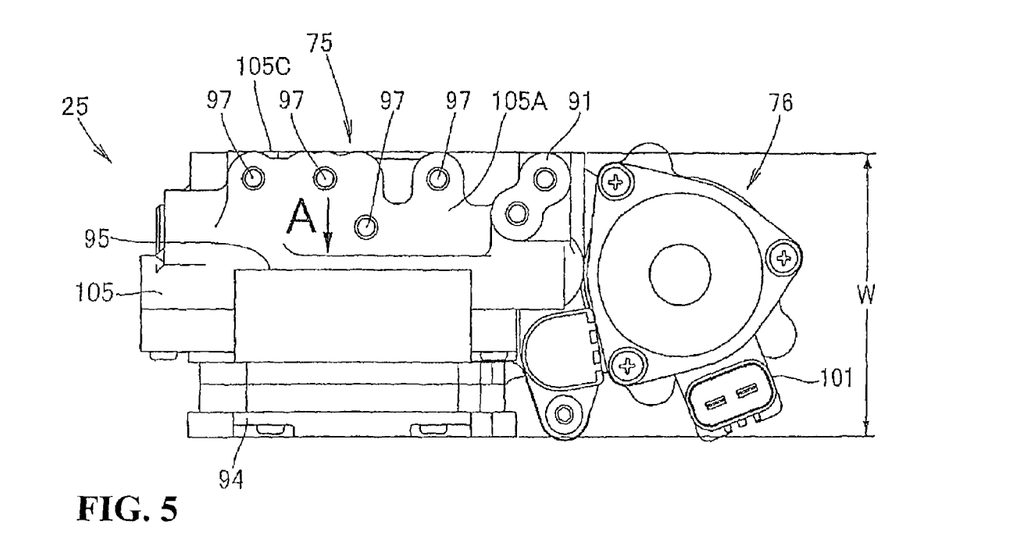
FIG. 5 is a diagram viewed along an arrow 5 in FIG. 4.

FIG. 5 is a diagram viewed along an arrow 5 in FIG. 4 (plan view). When the width of the channel switching unit 75 of the braking controller 25 is W, the hydraulic pressure generator 76 is arranged inside the width W.

The hydraulic pressure generator 76 is arranged in the width W of the channel switching unit 75. The width of the braking controller 25 can be reduced. The braking controller 25 can become smaller and compact.

In the upper portion of the channel switching unit 75, a connector 95 for connecting conductor wires connected to the electromagnetic valves 81 to 83 (see FIG. 4) and the pressure sensors 84 and 86 (see FIG. 4) to outside is integrally molded on the upper portion of a later-described body 105.

The connector 95 is opened toward one side surface 105C of the body 105 on which the channels are concentratively formed. The plural reference numerals 97 denote steel balls provided in the upper surface (an upper surface 105A of the body 105) of the channel switching unit 75 for covering holes opened at forming in the channels in the channel switching unit 75, and the reference numeral 101 denotes an electricity supplying connector for supplying electricity from outside to the electric motor 88.

As described above, in the present invention, the electric motor 88 as an actuator as a driving source of the hydraulic pressure generator 76 is housed in the width of the channel switching unit 75.

The braking controller 25 can become smaller and compact. The occupation space of the braking controller 25 can be further reduced. The braking controller 25 can be easily arranged in a small space of the vehicle 10.

Figure 6:
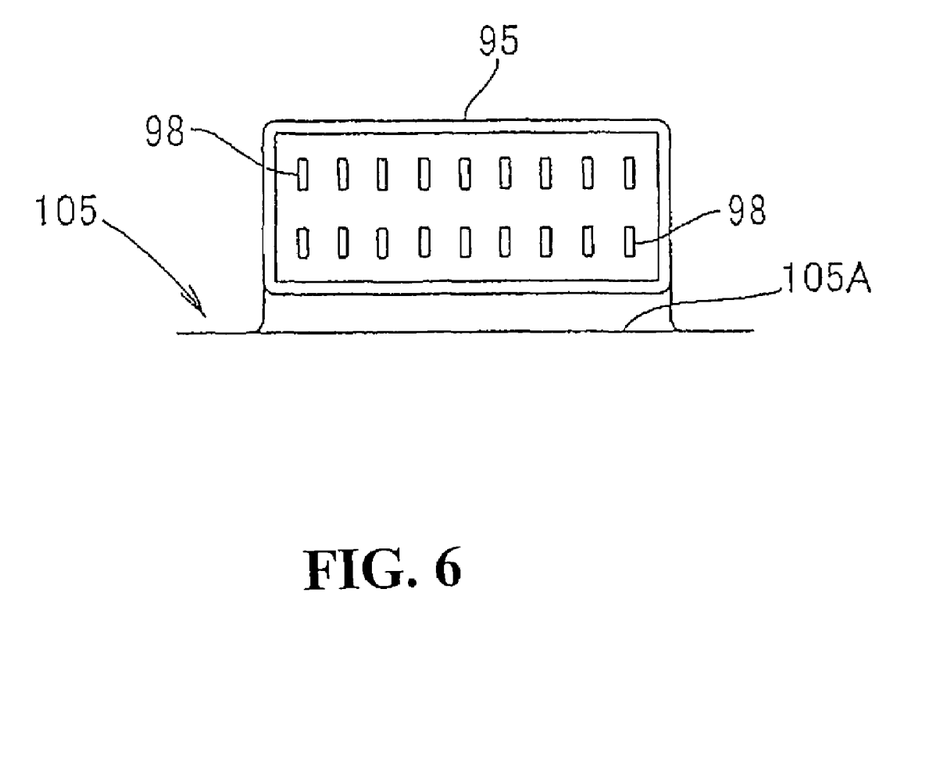
FIG. 6 is a diagram viewed along an arrow A in FIG. 5.

FIG. 6 is a diagram viewed along an arrow A in FIG. 5, and shows the connector 95 provided on the upper portion of the body 105. The connector 95, specifically, the frame of the connector 95 into which external connectors are inserted is integrally molded on the body 105, and plural connection terminals 98 are provided therein.

Figure 7:
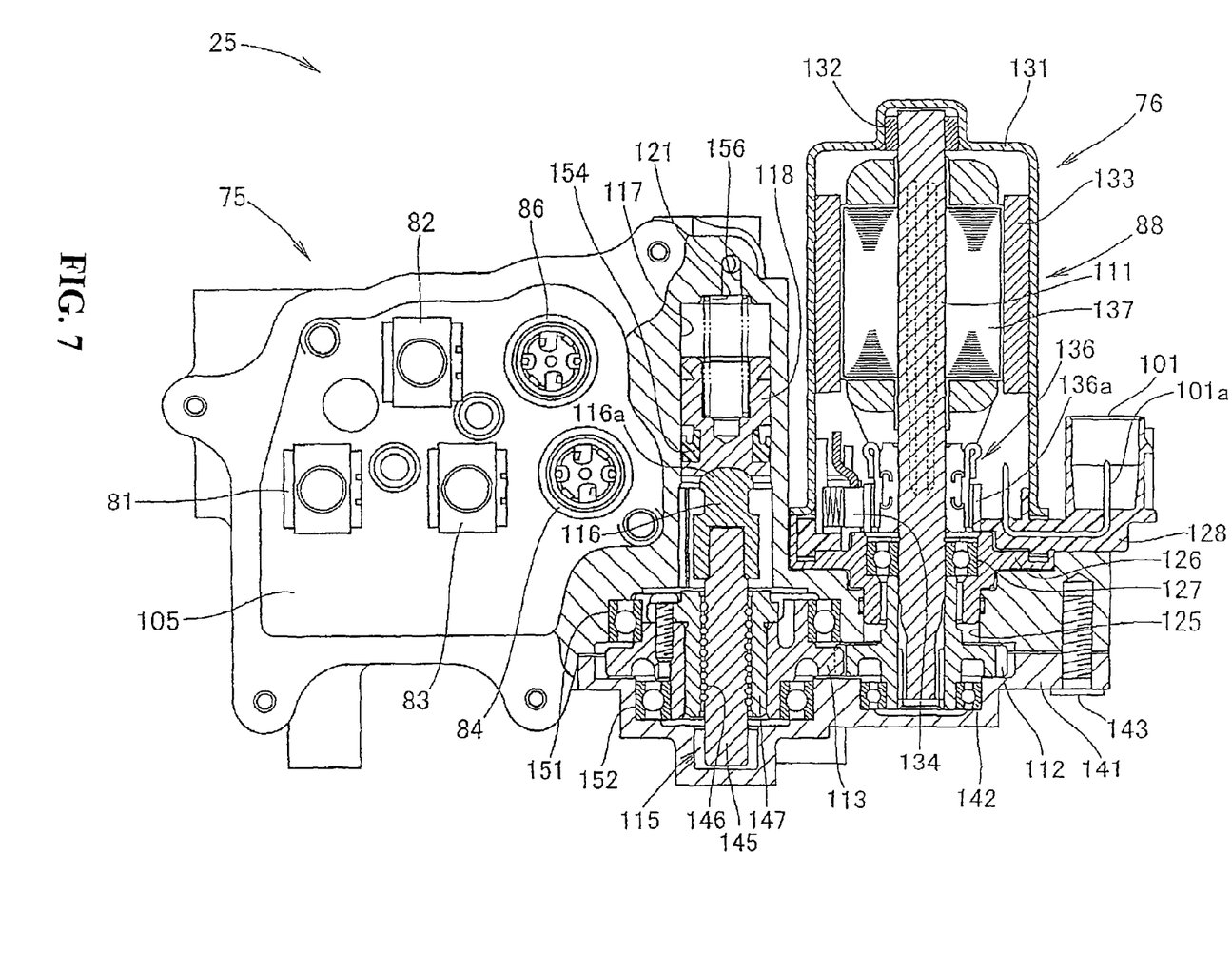
FIG. 7 is a cross-sectional view of the braking controller according to the present invention.

FIG. 7 is a cross-sectional view (partially side view) of the braking controller according to the present invention, and shows the state that the side portion cover 94 (see FIG. 4) is removed from the channel switching unit 75 and the cross section of the hydraulic pressure generator 76.

The first electromagnetic valve 81, the second electromagnetic valve 82, the third electromagnetic valve 83, the input side pressure sensor 84, and the output side pressure sensor 86 are inserted into the mounting holes formed in the body 105 so as to be mounted.

The hydraulic pressure generator 76 has the electric motor 88, a driving gear 112 spline coupled to the tip end of a rotation axis 111 of the electric motor 88, a driven gear 113 engaged with the driving gear 112, a ball screw 115 mounted on the driven gear 113, a push slider 116 mounted at the end of the ball screw 115, a piston 118 having its lower surface abutting on a head portion 116a provided in the push slider 116 and movably inserted into a cylinder hole 117 formed in the body 105, and a compression coil spring 121 provided between the end face of the cylinder hole 117 and the piston 118.

The electric motor 88 has a bearing portion 126 mounted in a motor mounting hole 125 formed in the body 105, a ball bearing 127 mounted on the bearing portion 126 for rotatably supporting the rotation axis 111, a motor housing 131 mounted to the bearing portion 126 via a connector forming member 128, a radial bearing (plain bearing) 132 mounted at the end of the motor housing 131 for supporting the rotation axis 111, a stator 133 mounted on the inner surface of the motor housing 131, the rotation axis 111, the electricity supplying connector 101 integrally molded on the connector forming member 128, a brush 134 connected to connection terminals 101a and 101a (only the reference numeral 101a on one side is shown) of the electricity supplying connector 101 via the conductor wires, not shown, a commutator 136 including plural commutator strips 136a mounted on the rotation axis 111 for making an electric current flow from the brush 134, and a rotor 137 mounted on the rotation axis 111 so as to be opposite the stator 133.

The lower end of the driving gear 112 is rotatably supported by a ball bearing 142 mounted on a lower portion cover 141 covering the lower portion of the body 105. The reference numeral 143 denotes a bolt mounting the lower portion cover 141 on the body 105.

The ball screw 115 includes a screw shaft 145 and a nut 147 coupled to the screw shaft 145 via plural steel balls 146. The driven gear 113 is fastened to the outer circumference surface of the nut 147 with machine screws.

The driven gear 113 is rotatably supported by a ball bearing 151 mounted on the body 105 and a ball bearing 152 mounted on the lower portion cover 141.

In the push slider 116, its rotation is prevented by a whirl-stop groove, not shown, and its axial movement can be performed. The head portion 116a of the push slider 116 is formed to be a convex spherical surface. The bottom surface of the piston 118 is formed to be a concave spherical surface slidably fitted on the spherical surface of the head portion 116 to absorb the tilt of the head portion 116a and the piston 118.

The piston 118 is always pushed against the head portion 116a by an elastic force of the compression coil spring 121. The reference numeral 154 denotes a seal member sealing the piston 118 with respect to the cylinder hole 117. The reference numeral 156 denotes a channel communicated from the cylinder hole 117 to the channel switching unit 75 side.

As explained in FIGS. 3 and 7, the present invention provides the wheel braking controller 60 of the vehicle 10 including the brake lever 61 as a brake operation member operated by a rider, the master cylinder 62 generating a hydraulic pressure according to an operation force of the brake lever 61, the brake caliper 17 as wheel braking means braking the front wheel 11 as a wheel based on operation of the brake lever 61, the channel switching unit 75 provided between the master cylinder 62 and the brake caliper 17 and switching channels of a brake fluid, and the hydraulic pressure generator 76 generating a hydraulic pressure based on operation of the brake lever 61 and the driving state of the vehicle 10 (see FIG. 1) and controlling braking of the front wheel 11 using the brake caliper 17 by the hydraulic pressure, wherein the braking controller 25 including the channel switching unit 75 and the hydraulic pressure generator 76 is integrally provided on one body 105.

As compared with the related art in which the channel switching unit and the hydraulic pressure generator are mounted separately, the number of mounting members such as brackets, bolts, and nuts necessary for mounting on the vehicle body can be reduced. Connecting members such as hoses connecting the channel switching unit and the hydraulic pressure generator can be omitted. The occupation space of the braking controller 25 in the vehicle body can be reduced. The number of parts can be reduced. The weight increase of the vehicle 10 can be suppressed. The wheel braking controller 60 can be simplified. With reduction of the number of the mounting members, the mounting man-hours can be reduced. The constitution of the wheel braking controller 60 can be simplified. The cost of the wheel braking controller 60 can be reduced.

As shown in FIG. 7, in the present invention, the actuator is constituted by the electric motor 88, and the braking controller 25 is mounted on the vehicle in the state that the rotation axis 111 of the electric motor 88 is vertical or almost vertical and in the state that the output side provided with the driving gear 112 of the rotation axis 111 is directed downward.

When the brush 134 and the commutator 136 in the electric motor 88 are arranged toward the lower end side of the rotation axis 111, abrasion particulates caused from the brush 134 can fall downward.

Figure 8:
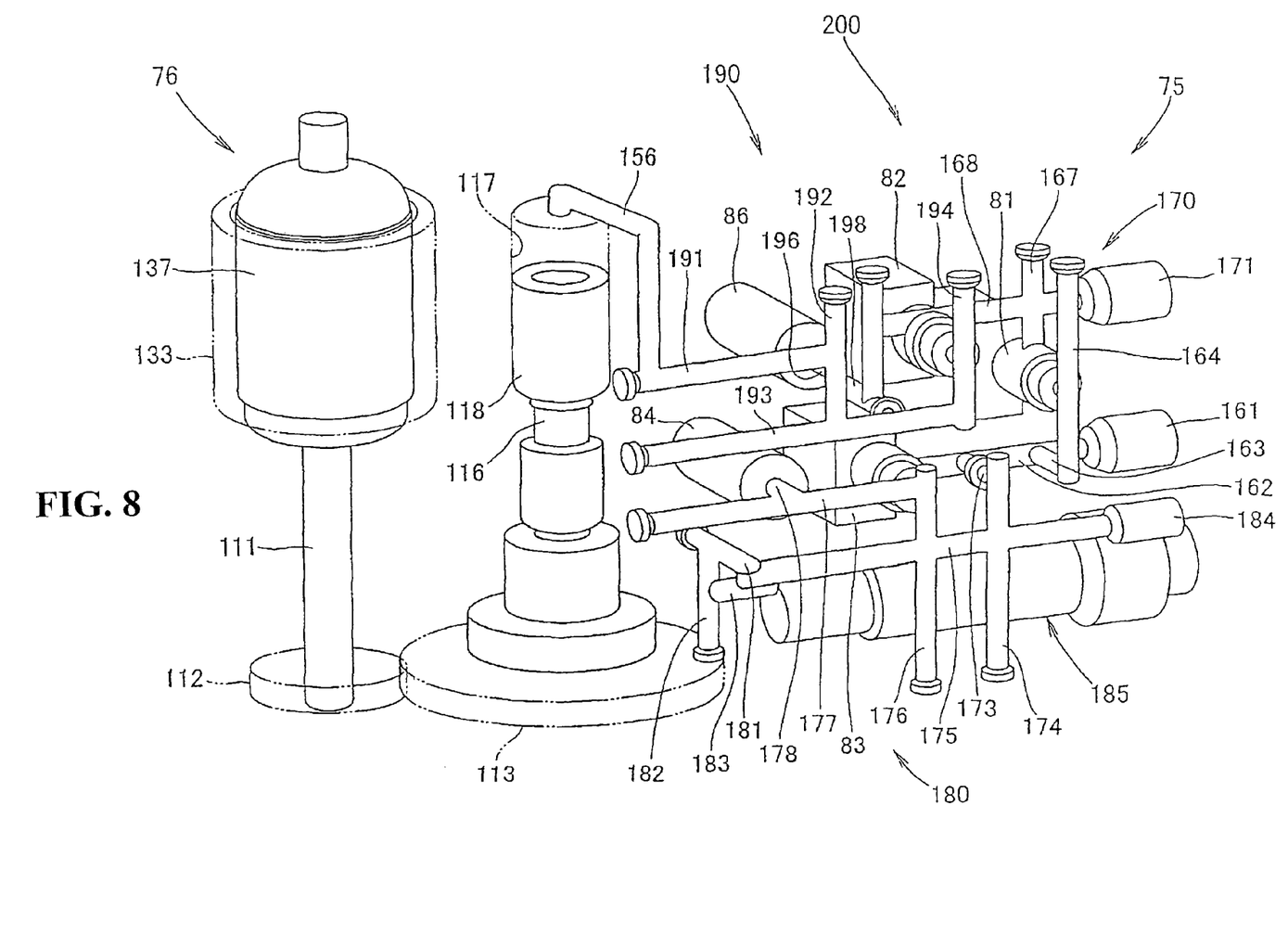
FIG. 8 is a perspective view showing the inner constitution of the braking controller according to the present invention.

FIG. 8 is a perspective view showing the inner constitution of the braking controller according to the present invention, and specifically shows the arrangement of the channels, electromagnetic valves, and the pressure sensors in the channel switching unit 75.

A first channel 170 provided in the channel switching unit 75 has an input connection port 161 in which the brake pipe 71 (see FIG. 3) extended from the master cylinder 62 (see FIG. 3) is detachably connected, a channel 162 horizontally extended from the input connection port 161, a channel 163 horizontally extended from the channel 162 in the direction orthogonal to the channel 162, a channel 164 vertically connected to the channel 163, a channel 167 connected to the channel 164 via the first electromagnetic valve 81 and extended vertically, a channel 168 horizontally connected to the channel 167, and an output connection port 171 connected to one end of the channel 168 and to which the brake pipe 72 (see FIG. 3) extended from the brake calipers 17 and 17 (see FIG. 3) side is detachably connected.

The input side sensor 84 is connected to the channel 162 via the third electromagnetic valve 83 and channels 176, 177, and 178.

A second channel 180 provided in the channel switching unit 75 has the input connection port 161, the channel 162, the channel 176 connected to the channel 162 via the third electromagnetic valve 83 and extended vertically, a channel 175 horizontally connected to the channel 176, a channel 181 horizontally connected to the channel 175 in the direction orthogonal to the channel 175, a channel 182 vertically connected to the channel 181, and a channel 183 horizontally connected to the channel 182 and in which its tip end is connected to a fluid loss simulator 185. The reference numeral 184 denotes an air release port provided at the end of the channel 175.

As described later in detail, the fluid loss simulator 185 is a device causing a responsive feeling of brake operation in a pseudo manner when the rider grips the brake lever 61 (see FIG. 3) to prevent a hydraulic pressure generated by the master cylinder 62 (see FIG. 1) from being transmitted to the brake calipers 17 and 17 (see FIG. 3).

A third channel 190 provided in the channel switching unit 75 has the hydraulic pressure generator 76, specifically, the channel 156 connected to the cylinder hole 117, a channel 191 horizontally connected to the channel 156, a channel 192 vertically connected to the channel 191, a channel 193 horizontally connected to the channel 192, a channel 194 vertically connected to the channel 193, the channel 168 connected to the channel 194 via the second electromagnetic valve 82 and extended horizontally, and the output connection port 171.

The output side sensor 86 is connected to the end of the channel 196 connected to the channel 192 and extended horizontally.

The first channel 170, the second channel 180, and the third channel 190 constitute a channel aggregate 200. The channel aggregate 200 is arranged on one side (in front in the drawing) of the channel switching unit 75.

Figure 9:
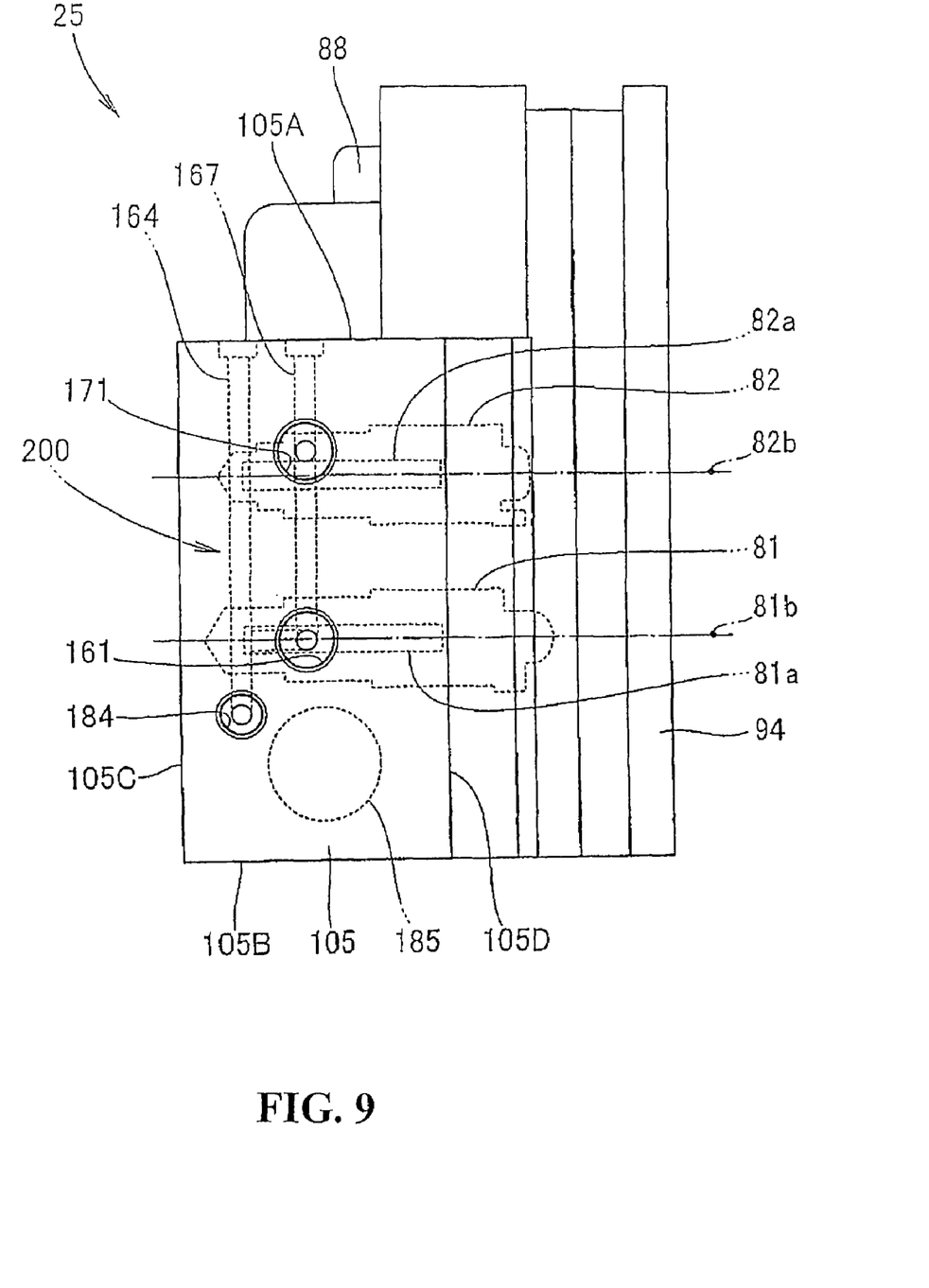
FIG. 9 is a diagram viewed along an arrow 9 in FIG. 4.

FIG. 9 is a diagram viewed along an arrow 9 in FIG. 4 (front view). The first electromagnetic valve 81, the second electromagnetic valve 82, and the third electromagnetic valve 83 (see FIG. 7) are solenoid valves mounted in such a manner that their axial directions are in parallel with the upper surface 105A and a lower surface 105B of the body 105. By changing voltage, valve bodies 81a, 82a, and 83a (the reference numeral 83a is not shown) provided inside are moved from one side surface 105C to the other side surface 105D or the other side surface 105D to one side surface 105C along axes 81b, 82b, and 83b (the reference numeral 83b is not shown) to open and close the channels.

The valve bodies 81a, 82a, and 83a are axial and long in the direction orthogonal to the rotation axis 111 (see FIG. 7) of the electric motor 88.

In the braking controller 25, the upper surface 105A and the lower surface 105B of the body 105 are horizontally mounted on the vehicle body of the vehicle. In the state that the vehicle is erected, the upper surface 105A and the lower surface 105B are horizontal to the ground. The axial directions of the first electromagnetic valve 81, the second electromagnetic valve 82, and the third electromagnetic valve 83 are also horizontal to the ground. Air stored in the brake fluid in the first electromagnetic valve 81, the second electromagnetic valve 82, and the third electromagnetic valve 83 can be easily released to improve the maintainability.

The channel aggregate 200 is arranged on one side surface 105C of the body 105. The first electromagnetic valve 81, the second electromagnetic valve 82, and the third electromagnetic valve 83 are connected to the channel aggregate 200 and extended to the other side surface 105D of the body 105.

As shown in FIGS. 3, 7, and 9, in the present invention, the channel switching unit 75 has the first electromagnetic valve 81 opening and closing the channel between the master cylinder 62 and the brake caliper 17 and the second electromagnetic valve 82 opening and closing the channel between the hydraulic pressure generator 76 and the brake caliper 17, and the first electromagnetic valve 81 and the second electromagnetic valve 82 are mounted in the state that the respective axial directions are horizontal or almost horizontal to the ground.

Air releasability from the first electromagnetic valve 81 and the second electromagnetic valve 82 can be improved to improve the maintainability.

As shown in FIGS. 7 and 9, in the present invention, in the braking controller 25, the channel aggregate 200 as the channels of the channel switching unit 75 is concentrated on one side of the body 105, that is, on one side surface 105C of the body 105.

The length of the channels of the channel aggregate 200 thereby can be shortened. The channels can be easily processed. When connecting members are connected to the channel aggregate 200 from outside, they can be connected in the same direction. The connecting operation can be easily performed. Although the wall thickness of the body 105 is necessary for forming the channels, only one side of the body 105 requires the wall thickness, so that the body 105 can be prevented from being larger.

Figure 10:
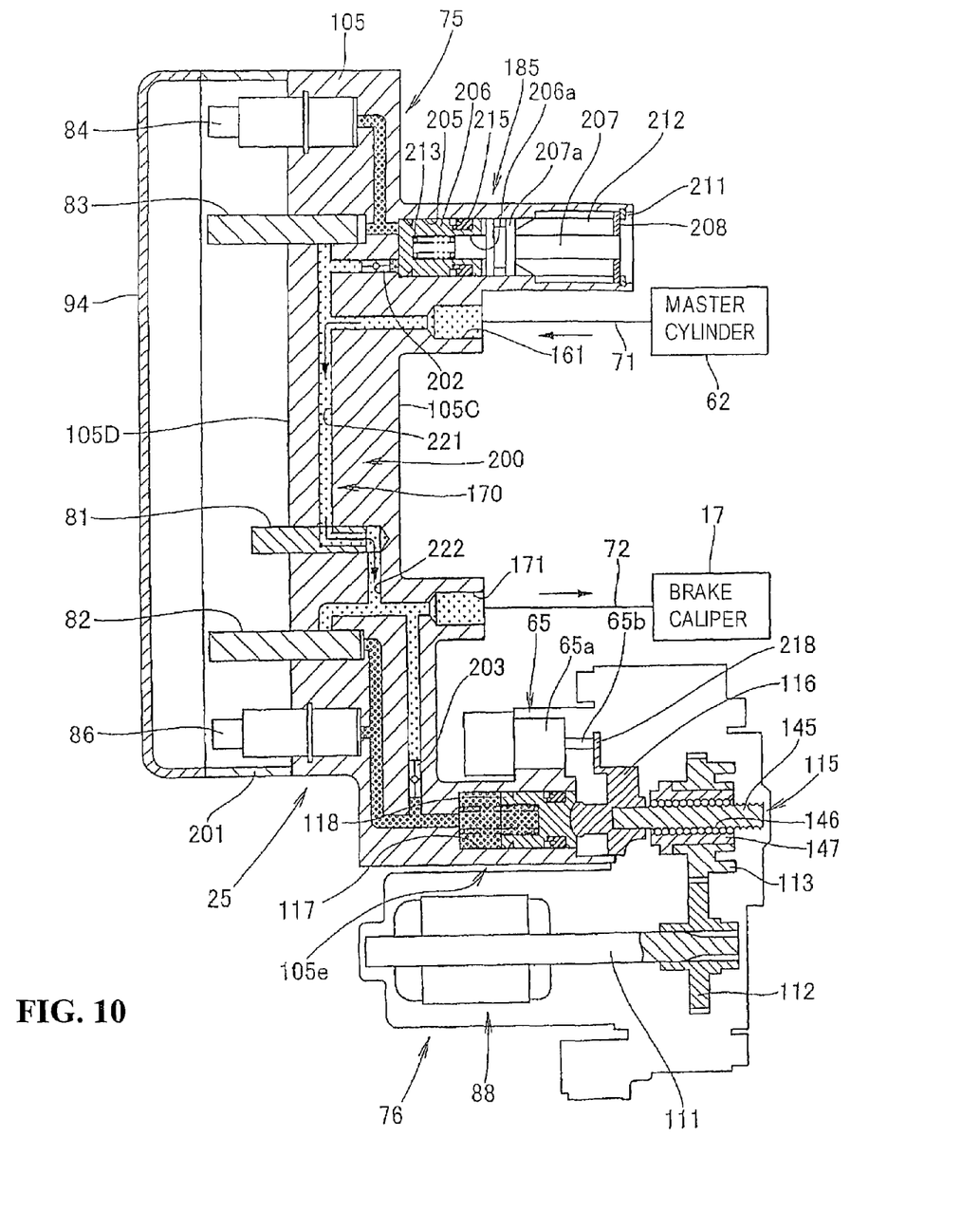
FIG. 10 is an explanatory view showing the constitution and a first operation of the braking controller according to the present invention.

FIG. 10 is an explanatory view showing the constitution and a first operation of the braking controller according to the present invention. In the drawing, the first electromagnetic valve 81, the second electromagnetic valve 82, and the third electromagnetic valve 83 are simply shown. The arrangement of the electromagnetic valves 81 to 83, the input side pressure sensor 84, the output side pressure sensor 86, the hydraulic pressure generator 76, and the fluid loss simulator 185 is different from that shown in FIGS. 4 to 9 but has the same basic constitution.

The channel switching unit 75 has the channel aggregate 200 formed in the body 105, the first electromagnetic valve 81, the second electromagnetic valve 82, and the third electromagnetic valve 83, the input side pressure sensor 84, the output side pressure sensor 86, and the fluid loss simulator 185. The reference numeral 201 denotes a frame member mounted on the other side surface 105D of the body 105 and having an opening covered by the side portion cover 94. The reference numerals 202 and 203 denote one-way valves.

The fluid loss simulator 185 has a piston 206 movably inserted into a cylinder hole 205 formed in the body 105, a rod member 207 having one end movably inserted into a hollow portion 206a formed in the piston 206, a resin repulsion member 212 inserted into the other end side of the rod member 207 and in which movement is regulated by a support plate 208 and a retaining ring 211 provided inside the cylinder hole 205, and a compression coil spring 213 arranged between one end of the hollow portion 206a and the rod member 207 and exerting the rod member 207 in the direction moving away from the piston 206. The reference numeral 207a denotes a large diameter portion formed in the intermediate portion of the rod member 207. The reference numeral 215 denotes a seal member fitted on the outer circumference portion of the piston 206 for sealing the cylinder hole 205 with respect to the piston 206.

The resin repulsion member 212 causes a quadratic curve reaction force at elastic deformation.

The stroke sensor 65 provided in the hydraulic pressure generator 76 is mounted on the side portion of a protrusion portion 105e of the body 105 formed with the cylinder hole 117. A detection strip 65b is protruded from a body portion 65a of the stroke sensor 65 so as to be moved forward or rearward. The tip end of the detection strip 65b protruded from a body portion abuts on a push plate 218 provided in the push slider 116. Therefore, when the push slider 116 is moved in the axial direction of the ball screw 115, the detection strip 65b is moved forward and rearward to detect the amount of stroke of the push slider 116 and the piston 118.

The operation of the above-described braking controller 25 will be explained with FIGS. 10 and 11. The operating brake fluid in the channel is indicated by plural dots. The non-operating brake fluid is indicated by plural diamond shapes.

In FIG. 10, when the main switch is off, the first electromagnetic valve 81 is in the opened state and the second electromagnetic valve 82 and the third electromagnetic valve 83 are in the closed state. When the brake lever is operated to generate a hydraulic pressure by the master cylinder 62, as indicated by the arrows, the brake fluid passes from the master cylinder 62 through the brake pipe 71 to the input connection port 161, then passes through the first channel 170, that is, the channel from the input connection port 161 through a channel 221, the first electromagnetic valve 81, a channel 222 to the output connection port 171, and finally passes through the brake pipe 72 to the brake caliper 17, thereby braking the front wheel. The channel 221 includes the channels 162, 162, and 164. The channel 222 includes the channels 167 and 168.

The above operation is performed when the braking controller 25 as well as the main switch is turned off.

Figure 11:
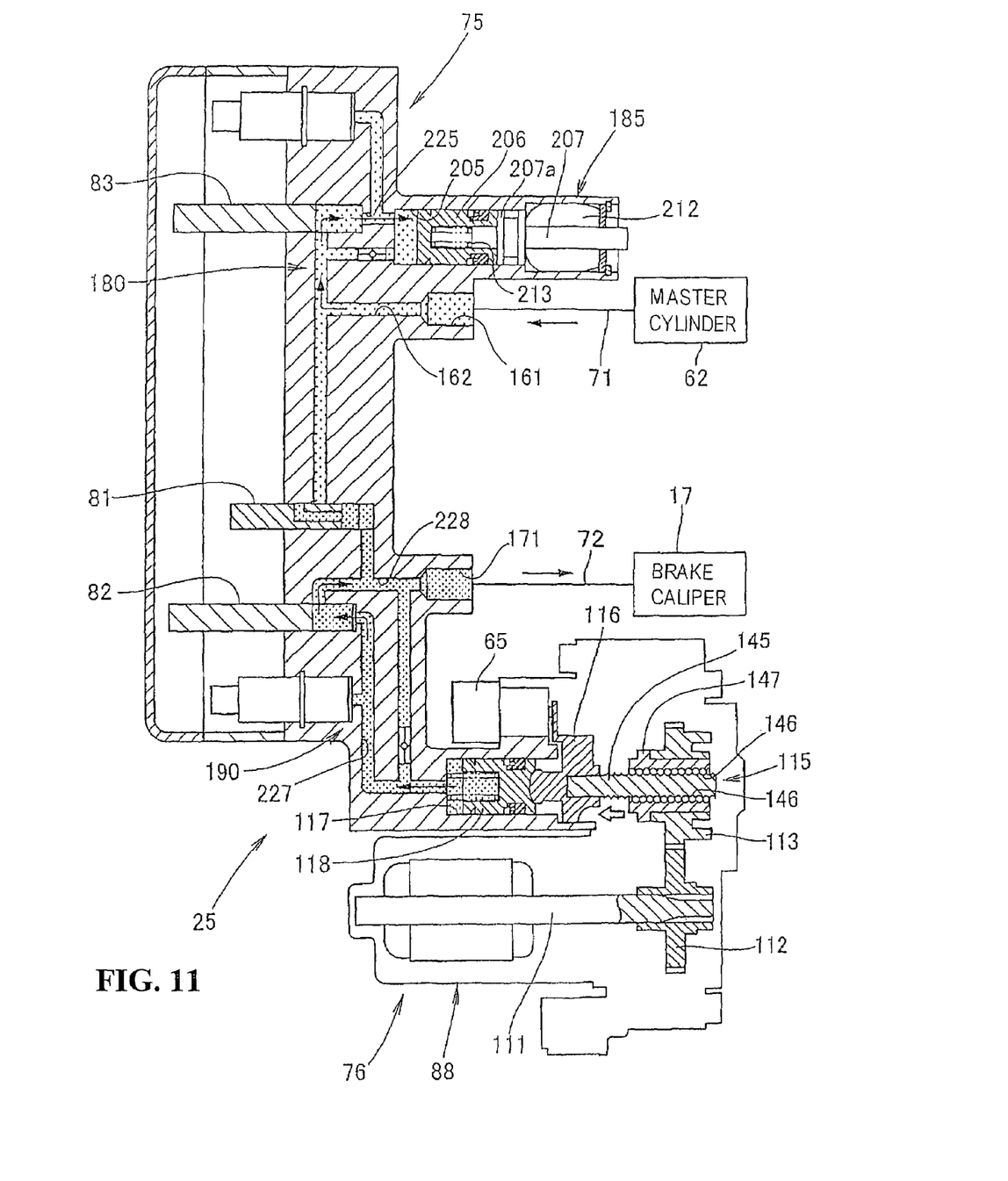
FIG. 11 is an explanatory view showing a second operation of the braking controller according to the present invention.

FIG. 11 is an explanatory view showing a second operation of the braking controller according to the present invention.

When the main switch is turned off, the first electromagnetic valve 81 is in the closed state and the second electromagnetic valve 82 and the third electromagnetic valve 83 are in the opened state. Therefore, when the brake lever is operated to generate a hydraulic pressure by the master cylinder 62, as indicated by the arrows, the brake fluid passes from the master cylinder 62 through the brake pipe 71 to the input connection port 161, then passes through the second channel 180, that is, the channel from the channel 162 through the third electromagnetic valve 83 to a channel 225, and reaches the fluid loss simulator 185. The channel 225 includes the channels 176, 175, 181, 182, and 183.

When the brake fluid flows into the cylinder hole 205 of the fluid loss simulator 185, the piston 206 is pushed out. The piston 206 is moved against an elastic force of the compression coil spring 213. When the tip end face of the piston 206 abuts on one end face of the large diameter portion 207a of the rod member 207, the rod member 207 starts to move and the large diameter portion 207a of the rod member 207 is moved. Thereby, the resin repulsion member 212 starts to deform by being interposed between the other end face of the large diameter portion 207a and the support plate 208. At this time, the reaction force of the resin repulsion member 212 is increased in the quadratic curve manner, the hand of the rider operating the brake lever feels response to normal brake operation.

In the hydraulic pressure generator 76, the input side pressure signal is transmitted from the input side pressure sensor 84 (see FIG. 3) to the controller 66 (see FIG. 3) with operation of the brake lever. The controller 66 outputs a driving signal driving the electric motor 88 as a control signal based on the input side pressure signal. The electric motor 88 then starts to operate.

When the rotation axis 111 of the electric motor 88 is rotated, rotation of the driving gear 112 is transmitted to the driven gear 113 and the nut 147 of the ball screw 115 is rotated, so that as indicated by the hollow arrow, the screw shaft 145 is moved in the axial direction via plural steel balls 146 and pushes up the piston 118 via the push slider 116.

As a result, the hydraulic pressure in the cylinder hole 117 is increased. The brake fluid in the cylinder 117 passes through the third channel 190, that is, the channel through a channel 227, the second electromagnetic valve 82, and the channel 228 to the output connection port 171, and then passes through the brake pipe 72 to the brake caliper 17, thereby braking the front wheel. The channel 227 includes the channels 156, 191, 192, 193, and 194.

In this embodiment, FIG. 3 shows the wheel braking controller 60 for the front wheel 11. The wheel braking controller for the rear wheel 13 shown in FIG. 1 is operated as in the front wheel braking controller 60.

The wheel braking controller of the present invention is suitable for a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel braking controller of a vehicle comprising:
a brake operation member operated by a rider;
a master cylinder generating a hydraulic pressure according to an operation force of the brake operation member;
wheel braking means braking a wheel based on operation of the brake operation member;
a channel switching unit provided between the master cylinder and the wheel braking means, and switching channels of a brake fluid, the channel switching unit having a plurality of electromagnetic valves;
a hydraulic pressure generator generating a hydraulic pressure based on operation of the brake operation member and the driving state of the vehicle, and controlling braking of the wheel using the wheel braking means by the hydraulic pressure; and
an actuator constituted as an electric motor as a driving source of the hydraulic pressure generator, wherein a braking controller including the channel switching unit and the hydraulic pressure generator are integrally provided on one body,
wherein the electric motor has an axis of rotation which is orthogonal to the plurality of valves, and is housed within a width direction of axes of the electromagnetic valves of the channel switching unit, and
wherein the plurality of electromagnetic valves of the channel switching unit includes:
a first electromagnetic valve opening and closing the channel between the master cylinder and the wheel braking means, and
a second electromagnetic valve opening and closing the channel between the hydraulic pressure generator and the wheel braking means,
a fluid loss simulator connected to one of the channels for causing a responsive feeling similar to that of a normal brake operation when the brake operations member is operated by the rider,
wherein a rotation axis of the actuator is perpendicular to a longitudinal axis of the fluid loss simulator, and
the first electromagnetic valve and the second electromagnetic valve are mounted in a state that respective axial directions are perpendicular to the rotation axis of the actuator and to the longitudinal axis of the fluid loss simulator.

2. The wheel braking controller of a vehicle according to claim 1,
wherein the braking controller is mounted on the vehicle in a state that the axis of rotation of the electric motor and a rotation axis of the screw shaft are parallel to each other in vertical or almost vertical direction, and in a state that the driving gear on an output side of the electric motor and the driven gear on an input side of the screw shaft are located at a lower side of the braking controller.

3. The wheel braking controller of a vehicle according to claim 1,
wherein the vehicle comprises a front fork and a cowling arranged on a side of the front fork,
wherein the braking controller is arranged on the side of the front fork and inside the cowling.

4. The wheel braking controller of a vehicle according to claim 1,
wherein the one body of the braking controller is formed with the channels, and the channels of the channel switching unit are concentrated on one surface side of the one body.

5. The wheel braking controller of a vehicle according to claim 1,
  wherein actuator and is operationally connected by a driving gear and a driven gear to a screw shaft and piston for adjusting the hydraulic pressure,
  wherein the screw shaft is mounted on the one body in a position between the channel switching unit and the hydraulic pressure generator, and
  actuator is housed in a width of the channel switching unit.

6. The wheel braking controller of a vehicle according to claim 2,
  wherein actuator and is operationally connected by a driving gear and a driven gear to a screw shaft and piston for adjusting the hydraulic pressure,
  wherein the screw shaft is mounted on the one body in a position between the channel switching unit and the hydraulic pressure generator, and
  actuator is housed in a width of the channel switching unit.

7. A wheel braking controller of a vehicle comprising:
  a brake lever operated by a rider;
  a master cylinder generating a hydraulic pressure according to an operation force of the brake lever;
  wheel braking means braking a wheel based on operation of the brake lever;
  a channel switching unit provided between the master cylinder and the wheel braking means, and switching channels of a brake fluid; and
  a hydraulic pressure generator generating a hydraulic pressure based on operation of the brake lever and the driving state of the vehicle, and controlling braking of the wheel using the wheel braking means by the hydraulic pressure,
  wherein a braking controller including the channel switching unit and the hydraulic pressure generator are integrally provided on one body which is mounted rearward of a cross pipe of a main frame of the vehicle,
  wherein the hydraulic pressure generator is operationally connected by a driving gear and a driven gear to a screw shaft and piston for adjusting the hydraulic pressure,
  wherein the screw shaft is mounted on the one body in a position between the channel switching unit and the hydraulic pressure generator, and
  hydraulic pressure generator is housed in a width of the channel switching unit.

8. The wheel braking controller of a vehicle according to claim 7,
  wherein an actuator as a driving source of the hydraulic pressure generator housed in the width of the channel switching unit,
  wherein the screw shaft and the piston are arranged in a cylinder hole of the one body adjacent to the actuator.

9. The wheel braking controller of a vehicle according to claim 7,
  wherein the actuator is constituted by an electric motor, and the braking controller is mounted on the vehicle in a state that a rotation axis of the electric motor and a rotation axis of the screw shaft are parallel to each other in vertical or almost vertical direction, and in a state that the driving gear on an output side of the electric motor and the driven gear on an input side of the screw shaft are located at a lower side of the braking controller.

10. The wheel braking controller of a vehicle according to claim 7,
  wherein the channel switching unit includes:
    a first electromagnetic valve opening and closing the channel between the master cylinder and the wheel braking means,
    a second electromagnetic valve opening and closing the channel between the hydraulic pressure generator and the wheel braking means, and
    a fluid loss simulator connected to one of the channels for causing a responsive feeling similar to that of normal brake operation when the brake operations member is operated by the rider, wherein the first electromagnetic valve and the second electromagnetic valve are mounted in a state that respective axial directions perpendicular to rotation axes of the actuator and the screw shaft and to a longitudinal axis of the fluid loss simulator.

11. The wheel braking controller of a vehicle according to claim 8,
  wherein the channel switching unit includes:
    a first electromagnetic valve opening and closing the channel between the master cylinder and the wheel braking means, and
    a second electromagnetic valve opening and closing the channel between the hydraulic pressure generator and the wheel braking means,
    wherein the first electromagnetic valve and the second electromagnetic valve are mounted in a state that respective axial directions are perpendicular to rotation axes of the actuator and the screw shaft.

12. A wheel braking controller of a vehicle comprising:
  a brake lever operated by a rider;
  a master cylinder generating a hydraulic pressure according to an operation force of the brake lever;
  wheel braking means braking a wheel based on operation of the brake lever;
  a channel switching unit provided between the master cylinder and the wheel braking means, and switching channels of a brake fluid; and
  a hydraulic pressure generator generating a hydraulic pressure based on operation of the brake lever and the driving state of the vehicle, and controlling braking of the wheel using the wheel braking means by the hydraulic pressure,
  wherein a braking controller including the channel switching unit and the hydraulic pressure generator are integrally provided on one body mounted inside a front cowling of the vehicle,
  wherein the hydraulic pressure generator is operationally connected by a pair of gears to a screw shaft and piston for adjusting the hydraulic pressure,
  wherein the screw shaft is mounted on the one body in a position between the channel switching unit and the hydraulic pressure generator, and
  hydraulic pressure generator is housed in a width of the channel switching unit.

13. The wheel braking controller of a vehicle according to claim 10,
  wherein the one body of the braking controller is formed with the channels, and the channels of the channel switching unit are concentrated on one surface side of the one body.

14. The wheel braking controller of a vehicle according to claim 8,
  wherein the one body of the braking controller is formed with the channels, and the channels of the channel switching unit are concentrated on one surface side of the one body.

15. The wheel braking controller of a vehicle according to claim 12,
    wherein the channel switching unit includes:
        a first electromagnetic valve opening and closing the channel between the master cylinder and the wheel braking means,
        a second electromagnetic valve opening and closing the channel between the hydraulic pressure generator and the wheel braking means, and
        a fluid loss simulator connected to one of the channels for causing a responsive feeling similar to that of a normal brake operation when the brake operations member is operated by the rider,
    wherein the first electromagnetic valve and the second electromagnetic valve are mounted in a state that respective axial directions are perpendicular to the rotation axes of the actuator and the screw shaft and to a longitudinal axis of the fluid loss simulator.

16. The wheel braking controller of a vehicle according to claim 12,
    wherein an actuator as a driving source of the hydraulic pressure generator is housed in the width of the channel switching unit,
    wherein the screw shaft and the piston are arranged in a cylinder hole of the one body adjacent to the actuator.

* * * * *